United States Patent [19]

Sakamoto et al.

[11] Patent Number: 5,349,610
[45] Date of Patent: Sep. 20, 1994

[54] DIGITAL DATA DETECTING AND SYNCHRONIZING CIRCUIT

[75] Inventors: Kazuo Sakamoto, Kobe; Tatsuya Fujii, Nishinomiya; Naoto Shiraishi, Minoo; Ryo Fukui, Yao; Yukihiro Imai, Kawanishi; Yutaka Sato, Settsu; Yoshiteru Yamada, Kobe, all of Japan

[73] Assignee: Ricoh Company, Ltd., Tokyo, Japan

[21] Appl. No.: 741,060

[22] Filed: Aug. 6, 1991

[30] Foreign Application Priority Data

Aug. 10, 1990 [JP] Japan ................................ 2-213146
Oct. 12, 1990 [JP] Japan ................................ 2-274047
Mar. 29, 1991 [JP] Japan ................................ 3-092878
Jun. 13, 1991 [JP] Japan ................................ 3-168757

[51] Int. Cl.[5] .......................... H04L 7/00; H04L 7/02
[52] U.S. Cl. .................................... 375/106; 375/110
[58] Field of Search ............... 375/118, 106, 119, 120, 375/110; 328/72, 63.55

[56] References Cited

U.S. PATENT DOCUMENTS

| 4,029,905 | 6/1993 | Abraham | 375/110 |
| 4,227,251 | 10/1980 | Kazama et al. | 375/110 |
| 4,752,942 | 6/1988 | Iwakami | 375/110 |
| 4,920,546 | 4/1990 | Iguchi et al. | 375/106 |

*Primary Examiner*—Tesfaldet Bocure
*Attorney, Agent, or Firm*—Cooper & Dunham

[57] ABSTRACT

A circuit for detecting digital data has a data-changing point detecting circuit for detecting a changing point of the digital data at which a value indicative of the digital data is changed from value 1 to value 0, or value 0 to value 1; an asynchronous detecting circuit for judging whether or not the changing point is caused at a timing synchronized with the timing of the internal clock signal; an asynchronous counter for counting the number of asynchronizations; a synchronous signal generating counter for generating a synchronous signal by the internal clock signal; and a reset control circuit for controlling the timing of a reset operation of the synchronous signal generating counter in accordance with outputs of the data-changing point detecting circuit and the asynchronous counter. Another digital data detecting circuit and a method for detecting digital data are also shown.

8 Claims, 11 Drawing Sheets

DIGITAL DATA DETECTING AND SYNCHRONIZING CIRCUIT

BACKGROUND OF THE INVENTION

1. Field of the Invention

The present invention relates to a circuit and a method for detecting digital data and used in a communication device, etc. having a phase control loop circuit (which is called a PLL circuit in the following description) for inputting data outputted from another electric device and synchronizing an internal clock signal with these input data.

2. Description of the Related Art

A data-receiving clock reproducing circuit is generally constructed by a circuit for detecting a data-changing point, a counter and a reset control circuit. A known phase control loop (PLL) circuit detects changing points in all data.

Such a phase control loop circuit has preferable follow-up characteristics with respect to the frequency of a transmitted clock signal. However, no countermeasure with respect to noises is taken in this phase control loop circuit. Accordingly, an operation of the phase control loop circuit is adversely affected by the noises.

Therefore, Japanese Patent Application Laying Open (KOKAI) No. 60-245351 discloses a method for detecting digital data and removing the influence of noises to accurately detect a data-changing point at any time. In this detecting method, a time series of detecting clock signals is formed in synchronization with an internal clock signal between respective bits of the digital data. Voltage levels of the digital data are respectively detected at timings of these detecting clock signals. The influence of a spike noise is removed by a majority operation of the plural detecting data provided by detecting these voltage levels so as to detect a position of the data-changing point. A timing for forming a receiving clock signal synchronized with the internal clock signal is controlled on the basis of this detection of the position of the changing point. Thus, a shift in synchronization of the detected digital data is prevented.

In many cases, the spike noise is caused with respect to data inputted to a communication device on a line for transmitting these data from a transmitting side of these data to a receiving side thereof. Further, in many cases, a jitter is caused at the data-changing point so that a period of the data-changing point is irregularly changed.

Accordingly, it is necessary to operate a phase control loop by the internal clock signal and the input data in a receiver so as to detect data on the signal-transmitting side without any error.

In the above general digital data detecting method, it is possible to remove the influence of a spike noise. However, a reset circuit of the phase control loop is operated at a changing point of the jitter so that a shift in synchronization of the digital data is temporarily caused, thereby causing an error in detection of the data.

Further, in the above detecting method, a timing for performing a resetting operation of the reset circuit is delayed as the number of samplings is increased to improve sensitivity with respect to noises, thereby reducing frequency follow-up characteristics. In contrast to this, when the number of samplings is reduced, the frequency follow-up characteristics are improved, but the sensitivity with respect to noises is reduced. Further, noise states on a line are different from each other in accordance with the communication device or a line distance. Namely, the number of noises is reduced on a certain line, but are increased on another line.

Accordingly, in accordance with the above general detecting method, the communication device can be used on a line providing a small noise, but cannot be used on a line providing a large noise. Further, the communication device can be used on the line providing a large noise, but has a reduced communication quality on the line providing a small noise.

SUMMARY OF THE INVENTION

It is therefore a first object of the present invention to provide a circuit and a method for detecting digital data in which no error in detection of the digital data is caused without any influences of a spike noise and a jitter.

A second object of the present invention is to provide a circuit for detecting digital data in which the trade-off of frequency follow-up characteristics and noise-proof characteristics is solved and no operation of this detecting circuit is easily influenced by a frequency deviation and noises to provide a stable phase control loop.

In accordance with a firs[structure of the present invention, the above first object can be achieved by a digital data detecting circuit for forming a receiving clock signal synchronized with an internal clock signal every bit of digital data and detecting contents of the digital data, the digital data detecting circuit comprising a data-changing point detecting circuit for detecting a changing point of the digital data at which a value indicative of the digital data is changed from value 1 to value 0, or value 0 to value 1; an asynchronous detecting circuit for judging whether or not the changing point is caused at a timing synchronized with the timing of the internal clock signal; an asynchronous counter for counting the number of asynchronizations; a synchronous signal generating counter for generating a synchronous signal by the internal clock signal; and a reset control circuit for controlling the timing of a reset operation of the synchronous signal generating counter in accordance with outputs of the data-changing point detecting circuit and the asynchronous counter.

The reset control circuit has a masking circuit for correcting a nonzero timing of the changing point to a zero timing in accordance with the output of the asynchronous counter.

The masking circuit is constructed by a positive masking circuit for correcting the timing of the changing point shifted in a positive shifting direction, and a negative masking circuit for correcting the timing of the changing point shifted in a negative shifting direction.

In accordance with the first structure of the present invention, the above first object can be also achieved by a digital data detecting method for forming a receiving clock signal synchronized with an internal clock signal every bit of digital data and detecting contents of the digital data based on this receiving clock signal, the digital data detecting method comprising the steps of detecting a changing point of the digital data at which a value indicative of the digital data is changed from value 1 to value 0, or value 0 to value 1; judging whether or not the changing point is synchronized with the internal clock signal; counting the number of asynchronizations; and controlling a timing for forming the receiving clock signal from a position of the changing point in accordance with the counting results.

In accordance with a second structure of the present invention, the above first object can be also achieved by a digital data detecting circuit for forming a receiving clock signal synchronized with an internal clock signal every bit of digital data and detecting contents of the digital data, the digital data detecting circuit comprising a synchronous signal generating counter for generating a synchronous signal by the internal clock signal; a data-changing point detecting circuit for detecting a changing point of the digital data at which a value indicative of the digital data is changed from value 1 to value 0, or value 0 to value 1; a masking circuit for masking a bit of a signal inputted thereto, the masking circuit inputting an output of the synchronous signal generating counter thereto when the changing point is detected by the data-changing point detecting circuit; a masking pattern control circuit for determining a masking bit to be masked with respect to all bits of the input signal of the masking circuit; and a reset control circuit for controlling the timing of a reset operation of the synchronous signal generating counter based on an output of the masking circuit; the masking pattern control circuit controlling an operation of the masking circuit such that the masking bit is changed in accordance with a shift amount of the timing of the changing point.

The masking pattern control circuit can generate plural kinds of masking patterns for changing the masking bit in accordance with the shift amount of the timing of the changing point, and the operation of the masking circuit is controlled on the basis of a masking pattern designated by a predetermined designated signal.

In accordance with a third structure of the present invention, the above second object can be achieved by a digital data detecting circuit for forming a receiving clock signal synchronized with an internal clock signal every bit of digital data and detecting contents of the digital data, the digital data detecting circuit comprising a synchronous signal generating counter for generating a synchronous signal by the internal clock signal; an asynchronous frequency detecting circuit for detecting the number of asynchronizations caused for a constant period and outputting a signal in accordance with a frequency in asynchronization; a changing point detecting circuit for detecting a changing point of the digital data at which a value indicative of the digital data is changed from value 1 to value 0, or value 0 to value 1, the changing point detecting circuit changing a pulse width for noise judgment in accordance with an output of the asynchronous frequency detecting circuit and neglecting a noise having a pulse width equal to or less than the pulse width for noise judgment; and a reset control circuit for controlling the timing of a reset operation of the synchronous signal generating counter in accordance with an output of the changing point detecting circuit.

In the circuit or method for detecting digital data in the first structure of the present invention, the number of jitters and the number of spike noises are reduced by controlling the timing of a reset operation of the synchronous signal generating counter based on an output of the counter for counting the number of asynchronizations and an output of the data-changing point detecting circuit.

Further, the number of jitters and the number of spike noises are reduced by correcting a nonzero timing of the changing point by the masking circuit in the case of a continuous synchronization.

In the digital data detecting circuit in the second structure of the present invention, the masking pattern control circuit controls an operation of the masking circuit such that the masking bit is changed in accordance with a shift amount of the timing of the changing point. Accordingly, the masking bit is corrected in accordance with the shift amount of the timing of the changing point. Therefore, it is possible to reduce the number of incorrect operations of the digital data detecting circuit caused by noises.

In the digital data detecting circuit in the third structure of the present invention, a pulse width for noise judgment is selected in accordance with asynchronous frequency so that the number of samplings of the digital data is adjusted in accordance with the amount of a noise. Accordingly, it is possible to stably operate a phase control loop in any line circumstances.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a circuit and a method for detecting digital data in the present invention will next be described in detail with reference to the accompanying drawings.

Figure 1:
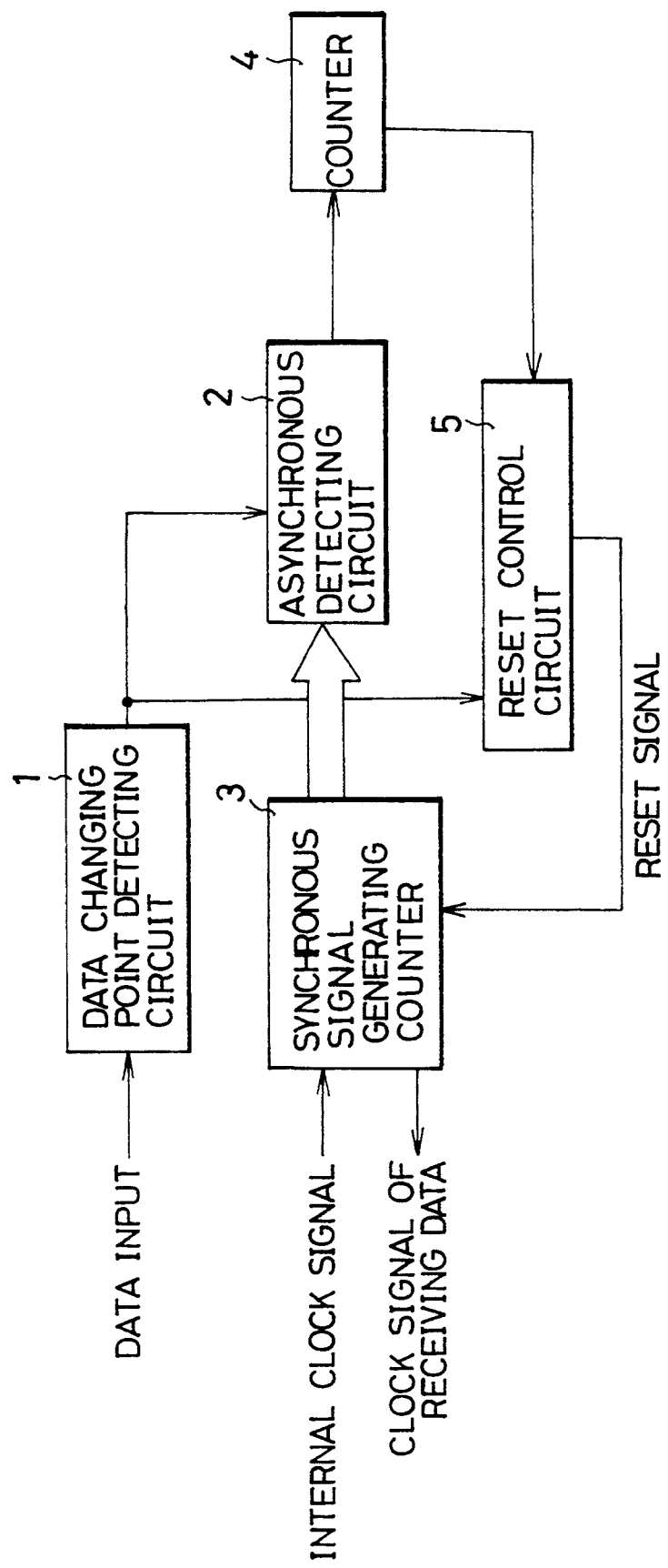
FIG. 1 is a block diagram showing the construction of a circuit for detecting digital data in the present invention.
Figure 2:
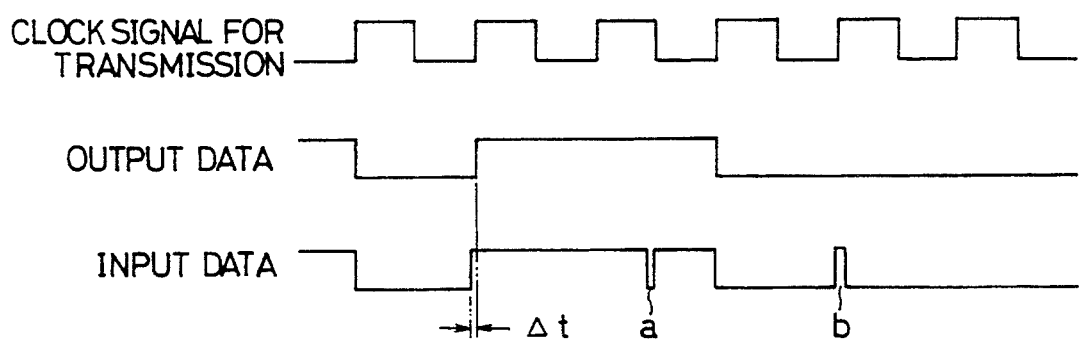
FIG. 2 is a timing chart with respect to data and input data to a basic clock signal having an arbitrary constant period.
Figure 3:
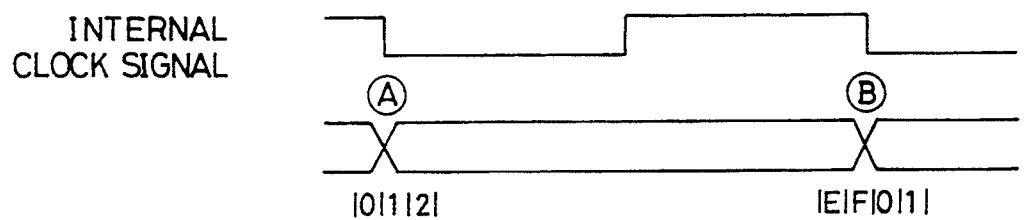
FIG. 3 is a timing chart showing a state in which one period of the basic clock signal is divided into sixteen sections.

FIG. 1 is a block diagram showing the construction of a circuit for detecting digital data in the present invention. FIGS. 2 and 3 are timing charts showing inputted digital data in the present invention. Namely, FIG. 2 shows the relation between input data and digital data formed on the basis of a clock signal having an arbitrary constant period. FIG. 3 shows a state in which one period of the clock signal is divided into sixteen sections composed of 0 to F.

As shown in FIG. 2, output data are formed with a transmitted clock signal having an arbitrary constant period as a basic clock signal. These output data are inputted to a receiver. With respect to these input data, there is a case in which a jitter shown by reference numeral Δt and spike noises shown by reference numerals a and b in FIG. 2 are caused.

As mentioned above, with respect to the output data, digital data are formed on the basis of the clock signal having a constant period. Accordingly, it is possible to predict the period of a changing point of the digital data on a receiver side. When one period of the clock signal is divided into sixteen sections as shown in FIG. 3, the digital data are changed at a zero timing at any time on a signal-transmitting side. Therefore, when the digital data are changed at point A on the receiver side, it is possible to predict a changing point B closest to this point A at the zero timing.

If the changing point B is located at the zero timing after the point A is located as a changing point, it is called synchronization in the following description. In contrast to this, if the changing point B is located at another timing shown by each of reference numerals 1 to F in FIG. 3 after the point A is located as a changing point, it is called asynchronization in which there is a shift in synchronization in the following description. If there is an asynchronous changing point after a continuous synchronous changing point, it is considered that the input data have a jitter or a spike noise. In the present invention, no resetting operation of a phase control loop (PLL) is performed at the asynchronous changing point.

A circuit and a method for detecting digital data in the present invention are constructed on the basis of the above-mentioned contents.

An entire construction of the digital data detecting circuit in the present invention will next be described in detail with reference to FIG. 1.

In FIG. 1, a data-changing point detecting circuit 1 detects a changing point at which value 1 is changed to value 0, or value 0 is changed to value 1 with respect to digital data inputted to this data-changing point detecting circuit 1. The data-changing point detecting circuit 1 outputs the detected changing point to an asynchronous detecting circuit 2 and a reset control circuit 5.

A synchronous signal generating counter 3 is a counter having an original period equal to the period of an internal clock signal synchronized with an inputted transmitting clock signal. A receiving clock signal of data is formed by arbitrarily dividing this internal clock signal with respect to frequency. A clock signal of receiving data is reproduced by resetting this counter 3. A counting value of this counter 3 is transmitted to the asynchronous detecting circuit 2.

The asynchronous detecting circuit 2 latches a timing at which the above changing point is detected by the data-changing point detecting circuit 1. The asynchronous detecting circuit 2 then detects whether there is asynchronization or not by an output of the counter 3 at this time. Namely, as mentioned above, when the changing point is located at the zero timing, the asynchronous detecting circuit 2 detects that it is synchronization. In contrast to this, when the changing point is located at another timing shown by each of reference numerals 1 to F in FIG. 3, the asynchronous detecting circuit 2 detects that it is asynchronization. The asynchronous detecting circuit 2 outputs the detected results to an updown counter 4. In the updown counter 4, value +1 is added to a counting value of the updown counter 4 in a synchronous case, and value −1 is added to the counting value of the updown counter 4 in an asynchronous case.

Counting values of the counters 3 and 4 are inputted to the reset control circuit 5 when the changing point is detected from the internal clock signal and the output of the data-changing point detecting circuit 1. The reset control circuit 5 generates a reset signal based on these counting values of the counters 3 and 4 and outputs this reset signal to the synchronous signal generating counter 3. Namely, the reset control circuit 5 controls an operation of the synchronous signal generating counter 3 such that no synchronous signal generating counter 3 is reset at an asynchronous changing point.

When the reset control circuit 5 has a masking circuit therein, it is judged by the counting value of the counter 4 that the reset control circuit 5 receives an arbitrary continuous synchronous signal. For example, when the counting value of the counter 4 is a predetermined value indicative of eight synchronizations, the reset control circuit 5 judges that the data-changing point is caused at the zero timing. The reset control circuit 5 then corrects a voltage value to zero at the data-changing point and removes a jitter and a spike noise.

A digital data detecting circuit in accordance with a first embodiment of the present invention will next be described in detail with reference to FIG. 4.

Figure 4:
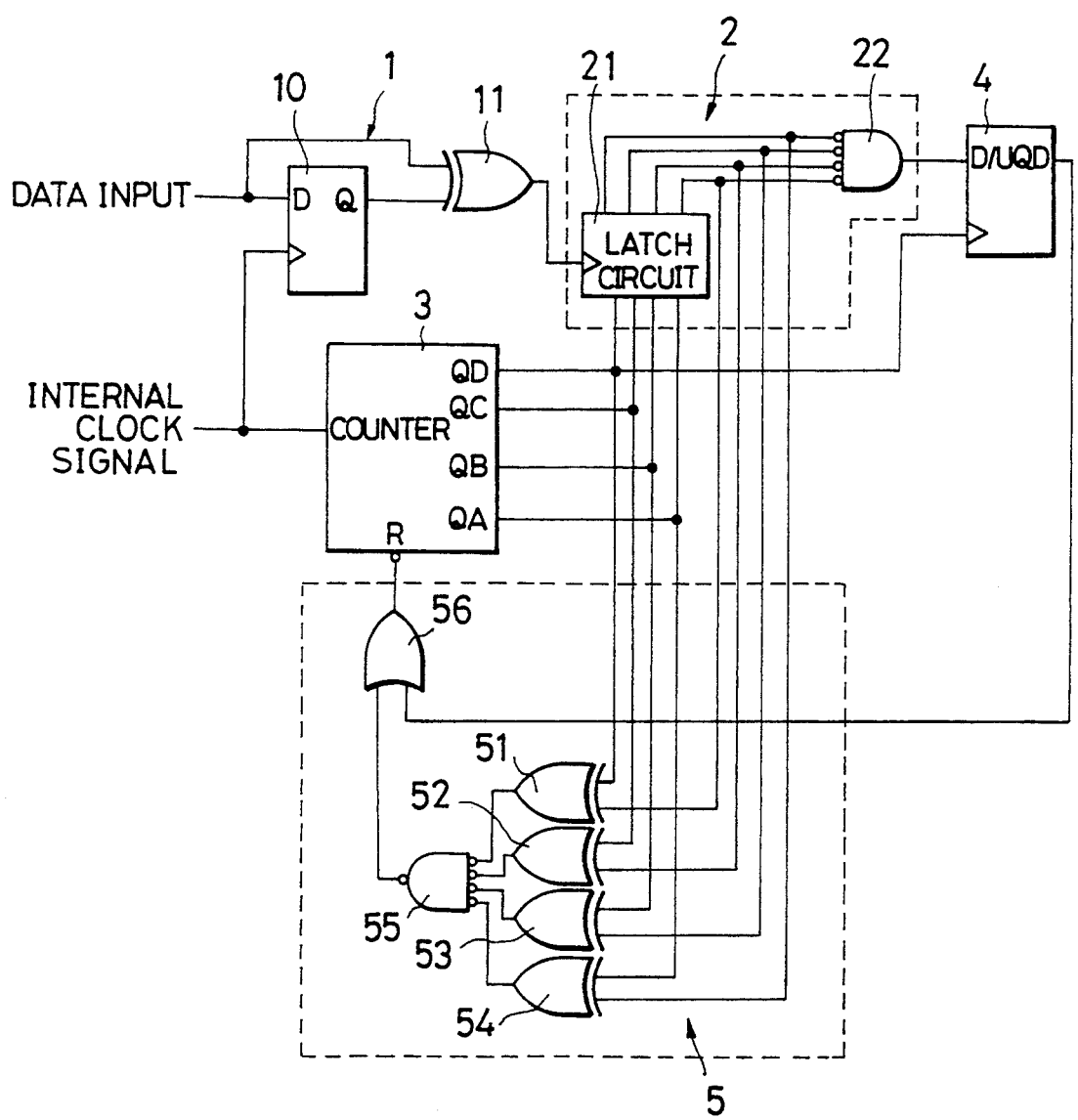
FIG. 4 is a circuit diagram showing a circuit for detecting digital data in accordance with a first embodiment of the present invention.

As shown in FIG. 4, an internal clock signal on a signal-receiving side is transmitted to a counter 3 constructed by four bits and a trigger terminal of a D-type flip-flop circuit 10 of the data-changing point detecting circuit 1. Received digital data are transmitted to a data terminal (D) of the flip-flop circuit 10.

An exclusive OR circuit 11 performs an exclusive OR operation with respect to the digital data and output data of the flip-flop circuit 10 at a Q-output terminal thereof. A detecting output indicative of a position of the changing point is outputted from the exclusive OR circuit 11 to a latch circuit 21 of the asynchronous detecting circuit 2.

The synchronous signal generating counter 3 repeatedly counts the number of internal clock signals from value 0 to value 15. The synchronous signal generating counter 3 then outputs parallel data about a counting value thereof from their output terminals QA, QB, QC, and QD.

The parallel outputs from the output terminals QA, QB, QC, and QD of the counter 3 are transmitted to the latch circuit 21 of the asynchronous detecting circuit 2 and exclusive OR circuits 51 to 54 of the reset control circuit 5. The parallel output from the output terminal QD is transmitted to the exclusive OR circuit 51. The parallel output from the output terminal QC is transmitted to the exclusive OR circuit 52. The parallel output from the output terminal QB is transmitted to the exclusive OR circuit 53. The parallel output from the output terminal QA is transmitted to the exclusive OR circuit 54.

When the detecting output indicative of a position of the changing point is transmitted to the latch circuit 21 from the exclusive OR circuit 11 of the changing point detecting circuit 1, the latch circuit 21 latches an output of the counter 3 at this time and data indicative of this output of the counter 3 are outputted to a NAND-functional circuit 22 and the exclusive OR circuits 51 to 54. The parallel outputs from the output terminals QA, QB, QC and QD of the counter 3 are thus inputted to the NAND-functional circuit 22. Accordingly, the NAND-functional circuit 22 outputs a signal having a high voltage only when all the parallel outputs from the output terminals QA, QB, QC and QD of the counter 3 show zero in voltage. In contrast to this, the NAND-functional circuit 22 outputs a signal having a low voltage except that all the parallel outputs from the output terminals QA, QB, QC and QD of the counter 3 show zero in voltage. Namely, a counting operation of the counter 4 is synchronized with a NAND operation of the NAND-functional circuit 22 only when the changing point is located at the zero timing of the internal clock signal. In this case, value +1 is added to the counting value of the counter 4. In contrast to this, in a case except for this case, the counting operation of the counter 4 is not synchronized with the NAND operation of the NAND-functional circuit 22 so that value −1 is added to the counting value of the counter 4.

An output QA from the latch circuit 21 is transmitted to the exclusive OR circuit 51. An output QB from the latch circuit 21 is transmitted to the exclusive OR circuit 52. An output QC from the latch circuit 21 is transmitted to the exclusive OR circuit 53. An output QD from the latch circuit 21 is transmitted to the exclusive OR circuit 54. As a result, the exclusive OR circuit 51 performs an exclusive OR operation with respect to the outputs QD and QA. The exclusive OR circuit 52 performs an exclusive OR operation with respect to the outputs QC and QB. The exclusive OR circuit 53 performs an exclusive OR operation with respect to the outputs QB and QD. The exclusive OR circuit 54 performs an exclusive OR operation with respect to the outputs QA and QD. The exclusive OR circuits 51 to 54 respectively transmit their outputs to an OR-functional circuit 55. An output of this OR-functional circuit 55 is provided as one input of an OR circuit 56.

An output of the counter 4 from the QD terminal thereof is provided as the other input of the OR circuit 56. An output of this OR circuit 55 is inverted and transmitted to the counter 3 as a reset signal thereof.

In this embodiment, the counter 4 outputs a signal having a high voltage from the terminal QD thereof when there are eight synchronizations, Namely, the counter 4 is reset until the number of synchronizations is eight, and no counter 4 is reset when the number of synchronizations is eight. A signal having a high voltage is outputted from the OR-functional circuit 55 except that the changing point is located at the zero timing. Accordingly, no counter 4 is reset in this case. The counter 4 is reset only when the changing point is located at the zero timing. Therefore, no counter 4 is reset at changing points caused by a jitter and a spike noise.

Figure 5:
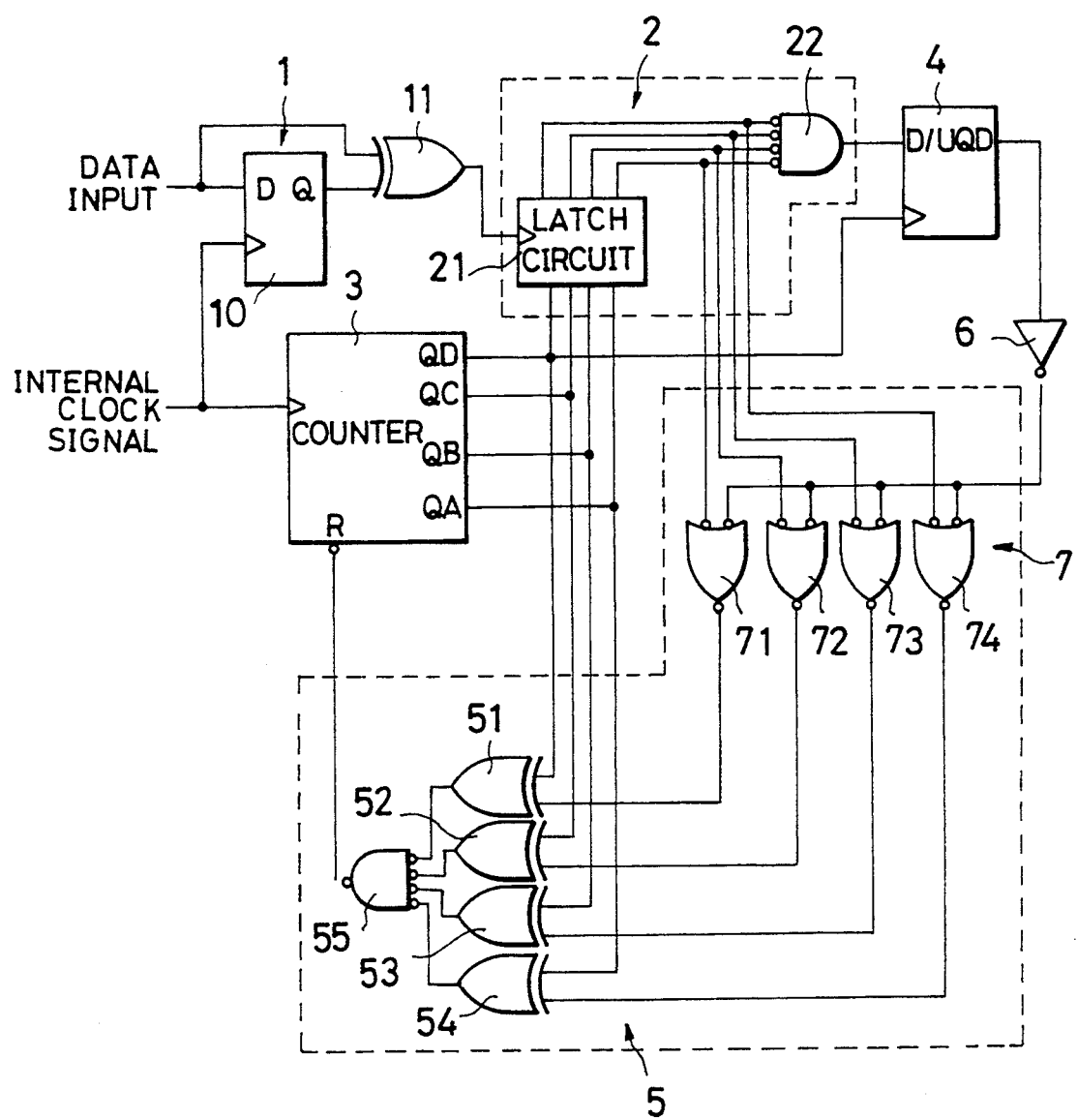
FIG. 5 is a circuit diagram showing a circuit for detecting digital data in accordance with a second embodiment of the present invention.

A digital data detecting circuit in accordance with a second embodiment of the present invention will next be described in detail with reference to FIG. 5.

In this embodiment, a masking circuit 7 is disposed within a reset control circuit 5 to correct the timing of a data-changing point to a zero timing. In this digital data detecting circuit, an output of a counter 4 from an output terminal QD thereof is inverted by an inverter 6 and is inputted to AND-functional circuits 71 to 74 constituting the masking circuit 7 as one inputs thereof. Outputs of a latch circuit 21 are inputted to the respective AND-functional circuits 71 to 74 as the other inputs thereof. Namely, an output QA of the latch circuit 21 is inputted to the AND-functional circuit 71. An output QB of the latch circuit 21 is inputted to the AND-functional circuit 72. An output QC of the latch circuit 21 is inputted to the AND-functional circuit 73. An output QD of the latch circuit 21 is inputted to the AND-functional circuit 74.

In the above digital data detecting circuit shown in FIG. 4, the outputs of the latch circuit 21 are respectively inputted to the exclusive OR circuits of the reset control circuit 5. However, in this second embodiment, outputs of the masking circuit 7 are respectively inputted to exclusive OR circuits. Namely, an output of the AND-functional circuit 71 is inputted to an exclusive OR circuit 51 as one input thereof. An output of the AND-functional circuit 72 is inputted to an exclusive OR circuit 52 as one input thereof. An output 04 the AND-functional circuit 73 is inputted to an exclusive OR circuit 53 as one input thereof. An output of the AND-functional circuit 74 is inputted to an exclusive OR circuit 54 as one input thereof.

Each of the exclusive OR circuits 51 to 54 performs an exclusive OR operation and outputs from these exclusive OR circuits 51 to 54 are inverted and inputted to an OR-functional circuit 55. An output of this OR-functional circuit 55 is inverted and transmitted to a counter 3 as a reset signal thereof.

When the number of synchronizations is eight, it is judged that a data-changing point is caused at the zero timing. The masking circuit 7 then corrects the timing of the data-changing point to the zero timing. Thus, the nonzero timing of the data-changing point is corrected by the masking circuit 7 for an arbitrary continuous period of a clock signal, thereby removing a jitter and a spike noise from the data.

Figure 6:
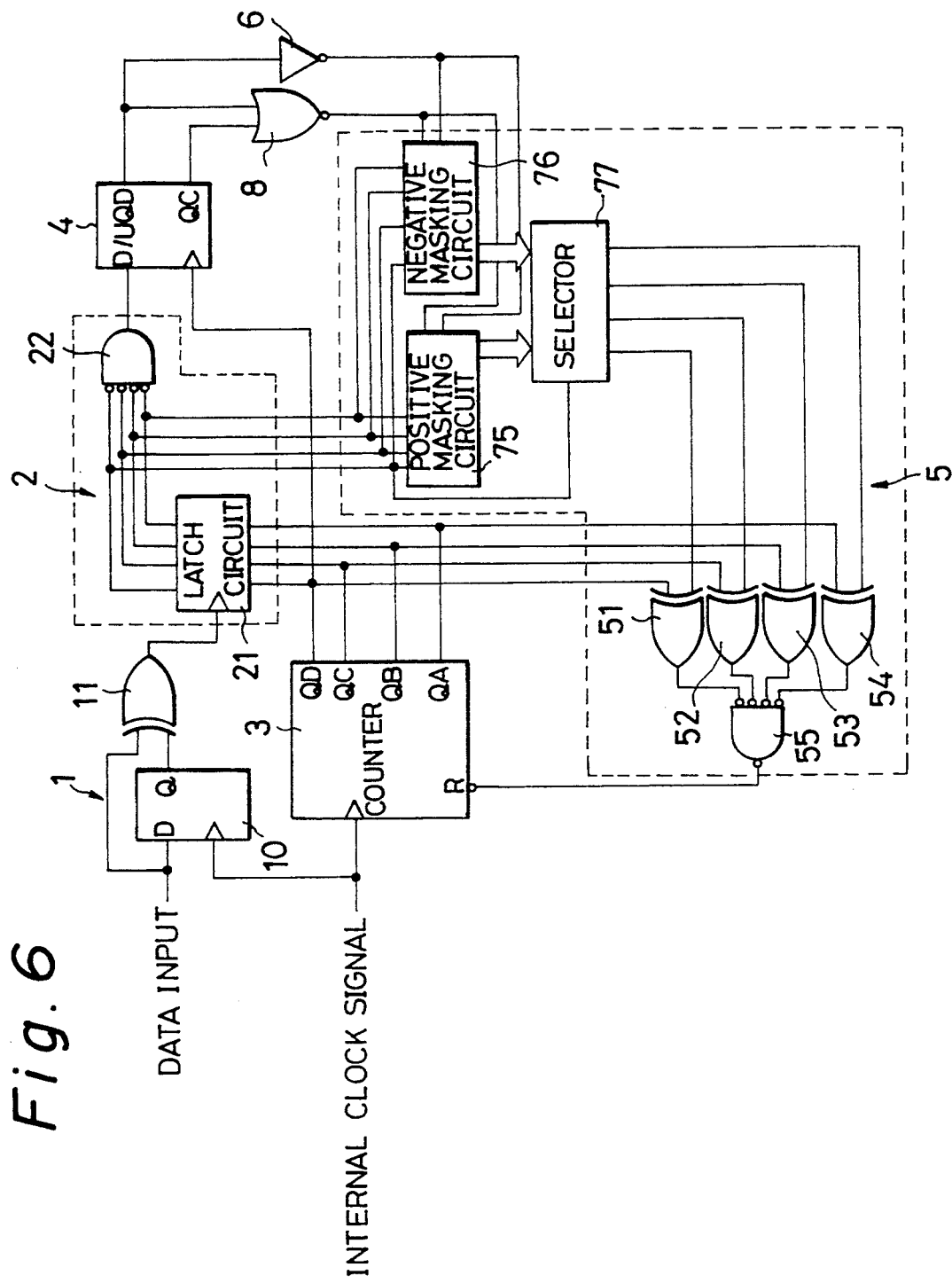
FIG. 6 is a circuit diagram showing a circuit for detecting digital data in accordance with a third embodiment of the present invention.

A digital data detecting circuit in accordance with a third embodiment of the present invention will next be described in detail with reference to FIG. 6.

In this embodiment, the outputs of a counter 4 are masked at two stages. Namely, an output of the counter 4 from an output terminal QD thereof is inputted to a positive masking circuit 75 and a negative masking circuit 76 through an inverter 6. Outputs of the counter 4 from output terminals QD and QC thereof are inputted to the positive masking circuit 75 and the negative masking circuit 76 through a NOR circuit 8. Outputs of the masking circuits 75 and 76 are selected by a selector 77. Similar to the digital data detecting circuit shown in FIG. 5, masked data are respectively outputted from the selector 77 to exclusive OR circuits 51 to 54.

Figure 7:
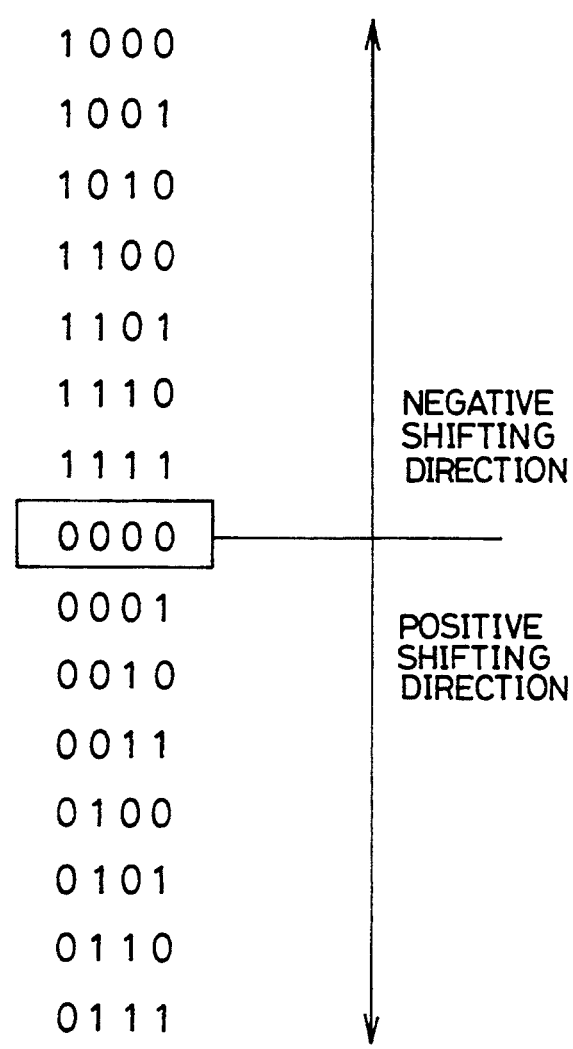
FIG. 7 is a view showing the relation between a counting value of a counter synchronized at a normal timing and counting values of the counter respectively shifted in positive and negative shifting directions of a data-changing point.

FIG. 7 shows outputs of a counter 3 when the data-changing point is located in a normal position and is shifted on negative and positive sides. As shown in FIG. 7, when the data-changing point is shifted by one bit, only a least significant bit of data is changed to one in the case of a positive shifting direction. In contrast to this, in the case of a negative shifting direction, all bits of data are changed to one when the data-changing point is shifted by one bit. Accordingly, for example, if only shifts in three bits are corrected, it is possible to cope with this correction by fixing two upper bits and correcting two lower bits in the case of the positive shifting direction. However, in the case of the negative shifting direction, it is necessary to control an operation of the digital data detecting circuit such that all the four bits are changed to one if the data-changing point is shifted by one bit. Further, in the case of the negative shifting direction, it is necessary to control the operation of the digital data detecting circuit such that three bits are changed to one if the data-changing point is shifted by two bits. Therefore, in this third embodiment, the positive masking circuit 75 and the negative masking circuit 76 are disposed with respect to the positive and negative shifting directions. The positive masking circuit 75 and the negative masking circuit 76 are selected in accordance with the shifts in data-changing point in the positive and negative shifting directions to correct the nonzero timing of the data-changing point to the zero timing.

A digital data detecting circuit in accordance with a fourth embodiment of the present invention will next be described in detail with reference to FIG. 8.

In this embodiment, a masking circuit 100 and a masking pattern control circuit 200 for controlling an operation of the masking circuit 100 are disposed within a reset control circuit 5.

A synchronous shift width at a changing point is corrected as follows by the masking circuit 100 and the masking pattern control circuit 200. Namely, as shown in Table 1, in step 0, the synchronous shift width is corrected to zero irrespective of a shift amount of this width.

+1. The shift width is corrected to −2 in a range in which the shift width (or shift amount in decimal number) is ranged from −3 to −4. The shift width is corrected to −4 in a range in which the shift width is ranged from −5 to −6. The shift width is corrected to −6 in a range in which the shift width is ranged from −7 to −8. The shift width is corrected to +2 in a range in which the shift width is ranged from +2 to +3. The shift width is corrected to +4 in a range in which the shift width is ranged from +4 to +5. The shift width is corrected to +6 in a range in which the shift width is ranged from +6 to +7.

In step 3, the shift width is corrected to zero in a range in which the shift width is ranged from −1 to 0. The shift width is reduced by one every shift amount in a range in which the shift width is ranged from −2 to −8. No shift width is corrected in a range in which the shift width is ranged from +1 to +7.

In step 4, no shift width is corrected.

The masking circuit 100 is constructed by a positive masking circuit 110 and a negative masking circuit 120. The positive masking circuit 110 is constructed by four AND-functional circuits 111 to 114. An output QA of the latch circuit 21 is inputted to a first input terminal of the AND-functional circuit 111. An output QB of the latch circuit 21 is inputted to a first input terminal of the AND-functional circuit 112. An output QC of the latch circuit 21 is inputted to a first input terminal of the AND-functional circuit 113. An output QD of the latch circuit 21 is inputted to a first input terminal of the AND-functional circuit 114.

The negative masking circuit 120 is constructed by four OR circuits 121 to 124. An output of the AND-functional circuit 111 of the positive masking circuit 110 is inputted to a first input terminal of the OR circuit 121. An output of the AND-functional circuit 112 of the positive masking circuit 110 is inputted to a first input terminal of the OR circuit 122. An output of the AND-

TABLE 1

| output of latch circuit binary number | shift amount decimal number | step 0 | | step 1 | | step 2 | | step 3 | | step 4 | |
|---|---|---|---|---|---|---|---|---|---|---|---|
| | | correction amount | shift amount after correction | correction amount | shift amount after correction | correction amount | shift amount after correction | correction amount | shift amount after correction | correction amount | shift amount after correction |
| 1000 | −8 | −8 | 0 | −4 | −4 | −2 | −6 | −1 | −7 | 0 | −8 |
| 1001 | −7 | −7 | 0 | −3 | −4 | −1 | −6 | −1 | −6 | 0 | −7 |
| 1010 | −6 | −6 | 0 | −2 | −4 | −2 | −4 | −1 | −5 | 0 | −6 |
| 1011 | −5 | −5 | 0 | −1 | −4 | −1 | −4 | −1 | −4 | 0 | −5 |
| 1100 | −4 | −4 | 0 | −4 | 0 | −2 | −2 | −1 | −3 | 0 | −4 |
| 1101 | −3 | −3 | 0 | −3 | 0 | −1 | −2 | −1 | −2 | 0 | −3 |
| 1110 | −2 | −2 | 0 | −2 | 0 | −2 | 0 | −1 | −1 | 0 | −2 |
| 1111 | −1 | −1 | 0 | −1 | 0 | −1 | 0 | −1 | 0 | 0 | −1 |
| 0000 | 0 | 0 | 0 | 0 | 0 | 0 | 0 | 0 | 0 | 0 | 0 |
| 0001 | +1 | +1 | 0 | +1 | 0 | +1 | 0 | 0 | +1 | 0 | +1 |
| 0010 | +2 | +2 | 0 | +2 | 0 | 0 | +2 | 0 | +2 | 0 | +2 |
| 0011 | +3 | +3 | 0 | +3 | 0 | +1 | +2 | 0 | +3 | 0 | +3 |
| 0100 | +4 | +4 | 0 | 0 | +4 | 0 | +4 | 0 | +4 | 0 | +4 |
| 0101 | +5 | +5 | 0 | +1 | +4 | +1 | +4 | 0 | +5 | 0 | +5 |
| 0110 | +6 | +6 | 0 | +2 | +4 | 0 | +6 | 0 | +6 | 0 | +6 |
| 0111 | +7 | +7 | 0 | +3 | +4 | +1 | +6 | 0 | +7 | 0 | +7 |

In step 1, the shift width is corrected to zero in a range in which the shift width is ranged from −4 to +3. Further, the shift width is corrected to −4 in a range in which the shift width is ranged from −5 to −8. Further, the shift width is corrected to +4 in a range in which the shift width is ranged from +4 to +7.

In step 2, the shift width is corrected to zero in a range in which the shift width is ranged from −2 to functional circuit 113 of the positive masking circuit 110 is inputted to a first input terminal of the OR circuit 123. An output of the AND-functional circuit 114 of the positive masking circuit 110 is inputted to a first input terminal of the OR circuit 124.

The masking pattern control circuit 200 includes an inverter 201 for inputting the output QA of the counter 4, an inverter 202 for inputting the output QB of the counter 4, an inverter 203 for inputting the output QC of the counter 4, and an inverter 204 for inputting the output QD of the counter 4.

An output of the inverter 201 is inputted to a NAND-functional circuit 211 and an inverter 231. An output of the inverter 202 is inputted to the NAND-functional circuit 211, a NAND-functional circuit 212 and an inverter 232. An output of the inverter 203 is inputted to one input terminal of an AND-functional circuit 206. An output of the inverter 204 is inputted to the other input terminal of the AND-functional circuit 206. An output of the AND-functional circuit 206 is inputted to the NAND-functional circuit 211, the NAND-functional circuit 212, the inverter 213 and the inverter 233.

An output of the NAND-functional circuit 211 is inputted to one input terminal of a NAND circuit 221. An output of the NAND-functional circuit 212 is inputted to one input terminal of a NAND circuit 222. An output of the inverter 213 is inputted to one input terminal of a NAND circuit 223.

An output of a NAND-functional circuit 205 is inputted to the other input terminals of the NAND circuits 221,222 and 223. The output QD of the latch circuit 21 and an output of the inverter 204 are inputted to the NAND-functional circuit 205.

An output of the NAND circuit 221 is inputted to second input terminals of the AND-functional circuits 113 and 114 of the positive masking circuit 110. An output of the NAND circuit 222 is inputted to a second input terminal of the AND-functional circuit 112 of the positive masking circuit 110. An output of the NAND circuit 223 is inputted to a second input terminal of the AND-functional circuit 111 of the positive masking circuit 110.

An output of the inverter 231 is inputted to a NOR circuit 241. An output of the inverter 232 is inputted to the NOR circuit 241 and a NOR circuit 242. An output of the inverter 233 is inputted to the NOR circuits 241,242 and an inverter 243.

An output of the NOR circuit 241 is inputted to one input terminal of a NOR-functional circuit 251. An output of the NOR circuit 242 is inputted to one input terminal of a NOR-functional circuit 252. An output of the inverter 243 is inputted to one input terminal of a NOR-functional circuit 253.

The output of the NAND-functional circuit 205 is inputted to the other input terminals of the NOR-functional circuits 251,252 and 253.

An output of the NOR-functional circuit 251 is inputted to second input terminals of the OR circuits 123 and 124 of the negative masking circuit 120. An output of the NOR-functional circuit 252 is inputted to a second input terminal of the OR circuit 122 of the negative masking circuit 120. An output of the NOR-functional circuit 253 is inputted to a second input terminal of the OR circuit 121 of the negative masking circuit 120.

When the output QD of the latch circuit 21 shows value "0", the output of the NAND-functional circuit 205 shows value "1" at any time. Accordingly, the outputs of the NOR-functional circuits 251 to 253 show value "0" at any time. As a result, an output of the masking circuit 100 is equal to an output of the positive masking circuit 110.

In contrast to this, the output of the NAND-functional circuit 205 shows value "0" when the output QD of the latch circuit 21 shows value "1" and the output of the inverter 204 shows value "1" and the output QD of the counter 4 shows value "0". Accordingly, the outputs of the NAND circuits 221 to 223 show value "1" at any time. As a result, the outputs QA to QD of the latch circuit 21 are respectively inputted to the first input terminals of the OR circuits 121 to 124 of the negative masking circuit 120. Namely, in this case, the output of the masking circuit 100 is equal to an output of the negative masking circuit 120.

The output of the NAND-functional circuit 205 shows value "1" at any time when the output QD of the latch circuit 21 shows value "1" and the output of the inverter 204 shows value "0" and the output QD of the counter 4 shows value "1". Accordingly, the outputs of the NOR-functional circuits 251 to 253 show value "0" at any time. As a result, the output of the masking circuit 100 is equal to an output of the positive masking circuit 110.

Figure 8:
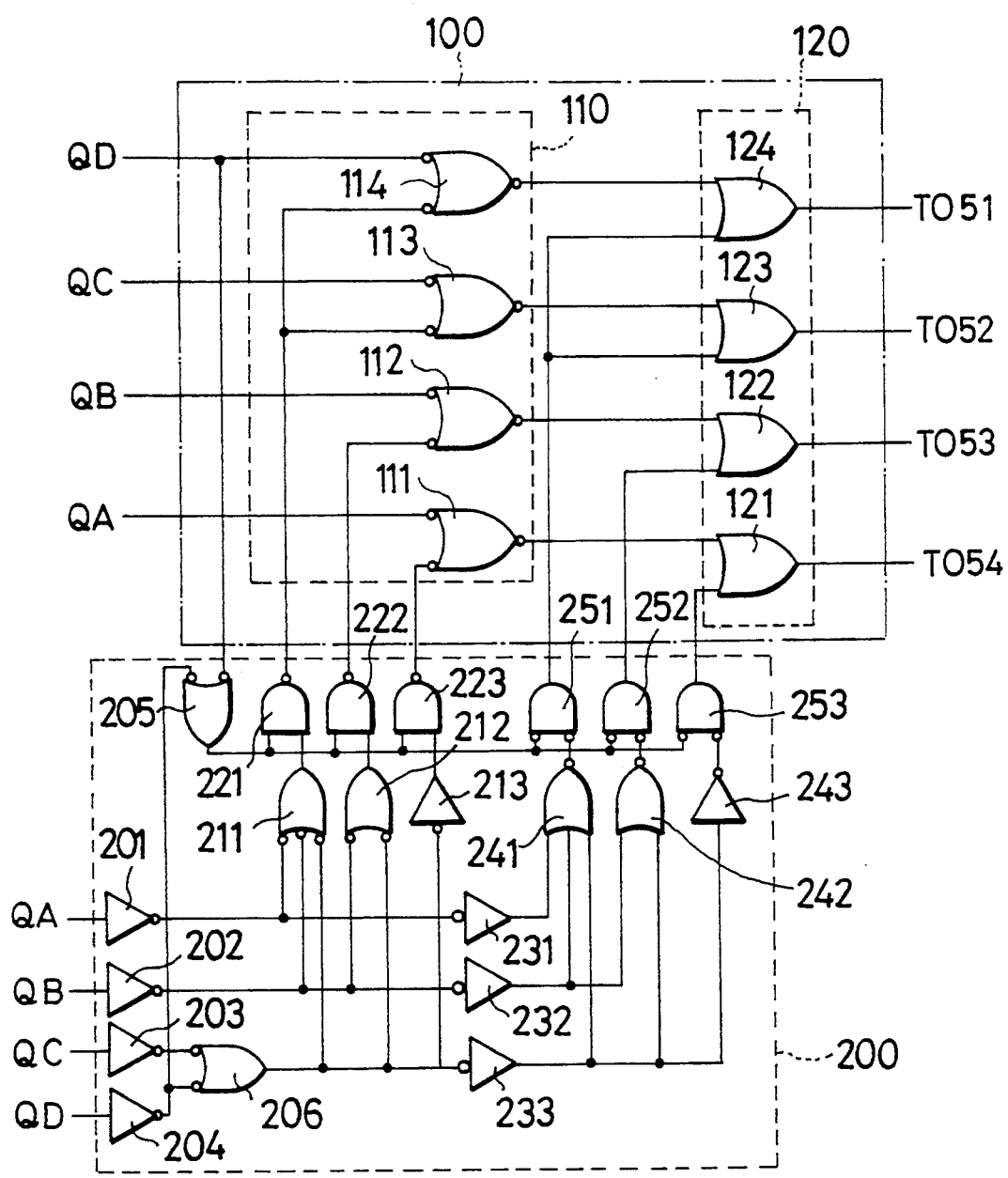
FIG. 8 is a circuit diagram showing a circuit for detecting digital data in accordance with a fourth embodiment of the present invention.

The operation of the digital data detecting circuit shown in FIG. 8 wi 11 next be described in detail in step 0 in which a counting value of the counter 4 i s zero, i n step 1 i n which the counting value of the counter 4 is one, in step 2 in which the counting value of the counter 4 is 2 and 3, in step 3 in which the counting value of the counter 4 is 4 to 7, and in step 4 in which the counting value of the counter 4 is equal to or greater than 8.

(1) In the case of the counting value zero of the counter 4.

In this case, all outputs QA, QB, QC and QD of the counter 4 show value "0". Accordingly, all outputs of the inverters 201,202,203 and 204 show value "1". Accordingly, all outputs of the NAND-functional circuits 211,212 and the inverter 213 show value "0". Further, outputs of the NAND circuits 221, 222 and 223 show value "1" at any time.

Further, outputs of the inverters 231,232 and 233 show value "0". Outputs of the NOR circuits 241,242 and the inverter 243 show value "1". Therefore, outputs of the NOR-functional circuits 251,252 and 253 show value "0" at any time.

Accordingly, in this case, the outputs QA to QD of the latch circuit 21 are respectively outputted from the masking circuit 100 to the exclusive OR circuits 51 to 54 as they are. As a result, the counter 3 is reset at a changing point.

(2) In the case of the counting value one of the counter 4.

(2-1) When the output QD of the latch circuit 21 shows value "0".

As mentioned above, the output of the masking circuit 100 is equal to an output of the positive masking circuit 110 when the output QD of the latch circuit 21 shows value "0".

In this case, the output QA of the counter 4 shows value "1" and the outputs QB, QC and QD thereof show value "0". Accordingly, an output of the inverter 201 shows value "0" and outputs of the inverters 202,203 and 204 show value "1". An output of the NAND-functional circuit 211 shows value "1" and outputs of the NAND-functional circuit 212 and the inverter 213 show value "0".

When the output QD of the latch circuit 21 shows value "0", an output of the NAND-functional circuit 205 shows value "1". Accordingly, an output of the NAND circuit 221 shows value "0" and outputs of the NAND circuits 222 and 223 show value "1".

Accordingly, outputs of the AND-functional circuits 113 and 114 of the positive masking circuit 110 show value 0" at any time. Further, an output of the AND-functional circuit 111 shows value "1" if the output QA of the latch circuit 21 shows value "1". In contrast to this, the output of the AND-functional circuit 111 shows value "0" if the output QA of the latch circuit 21 shows value "0". Similarly, an output of the AND-functional circuit 112 shows value "1" if the output QB of the latch circuit 21 shows value "1". In contrast to this, the output of the AND-functional circuit 112 shows value "0" if the output QB of the latch circuit 21 shows value "0".

As a result, when binary numbers represented by the outputs QD to QA of the latch circuit 21 are "0000", "0001", "0010" and "0011", an output of the masking circuit 100 shows the same binary numbers "0000", "0001", "0010" and "0011". The counter 3 is reset when an output of the counter 3 shows the binary numbers "0000", "0001", "0010" and "0011". Accordingly, when the binary numbers represented by the outputs QD to QA of the latch circuit 21 show "0000", "0001", "0010" and "0011", a synchronous shift width at the changing point is corrected to zero. Namely, when the synchronous shift width in the positive shifting direction at the changing point is equal to or less than 3, the synchronous shift width at the changing point is corrected to zero.

When the binary numbers represented by the outputs QD to QA of the latch circuit 21 show "0100", "0101", "0110" and "0111", an output of the masking circuit 100 shows "0000", "0001", "0010" and "0011". The counter 3 is reset when an output of the counter 3 shows "0000", "0001", "0010" and "0011". Accordingly, when the binary numbers represented by the outputs QD to QA of the latch circuit 21 show "0100", "0101", "0110" and "0111", a synchronous shift width at the changing point is corrected to +4 as a decimal number. Namely, when the synchronous shift width in the positive shifting direction at the changing point is equal to or greater than 4, the synchronous shift width at the changing point is corrected +4 as a decimal number.

(2-2) When the output QD of the latch circuit 21 shows value "1".

As mentioned above, the output of the masking circuit 100 is equal to an output of the negative masking circuit 120 when the output QD of the latch circuit 21 shows value "1".

In this case, an output QA of the counter 4 shows value "1" and outputs QB, QC and QD thereof show value "0". Accordingly, an output of the inverter 201 shows value "0" and outputs of the inverters 202, 203 and 204 show value "1". An output of the inverter 231 shows value "1" and outputs of the inverters 232 and 233 show value "0". Further, an output of the NOR circuit 241 shows value "0" and outputs of the NOR circuit 242 and the inverter 243 show value "1".

The output QD of the latch circuit 21 shows value "1" and the output QD of the counter 4 shows value "1" so that an output of the NAND-functional circuit 205 shows value "0". Accordingly, an output of the NOR-functional circuit 251 shows value "1" and outputs of the NOR-functional circuits 252 and 253 show value "0".

Accordingly, outputs of the OR circuits 123 and 124 of the negative masking circuit 120 show value "1" at any time. Further, an output of the OR circuit 121 shows value "1" if the output QA of the latch circuit 21 shows value "1". In contrast to this, the output of the OR circuit 121 shows value "0" if the output QA of the latch circuit 21 shows value "0". Similarly, an output of the OR circuit 122 shows value "1" if the output QB of the latch circuit 21 shows value "1". In contrast to this, the output of the OR circuit 122 shows value "0" if the output QB of the latch circuit 21 shows value "0".

As a result, when binary numbers represented by the outputs QD to QA of the latch circuit 21 are "1111", "1110", "1101" and "1100", an output of the masking circuit 100 shows the same binary numbers "1111", "1110", "1101" and "1100". The counter 3 is reset when an output of the counter 3 shows the binary numbers "1111", "1110", "1101" and "1100". Accordingly, when the binary numbers represented by the outputs QD to QA of the latch circuit 21 show "1111", "1110", "1101" and "1100", a synchronous shift width at the changing point is corrected to zero. Namely, when the synchronous shift width in the negative shifting direction at the changing point is equal to or less than 4, the synchronous shift width at the changing point is corrected to zero.

When the binary numbers represented by the outputs QD to QA of the latch circuit 21 show "1011", "1010", "1001" and "1000", an output of the masking circuit 100 shows "1111", "1110", "1101" and "1100". The counter 3 is reset when an output of the counter 3 shows "1111", "1110", "1101" and "1100". Accordingly, when the binary numbers represented by the outputs QD to QA of the latch circuit 21 show "1011", "1010", "1001" and "1000", a synchronous shift width at the changing point is corrected to −4. Namely, when the synchronous shift width in the negative shifting direction at the changing point is equal to or greater than 5, the synchronous shift width at the changing point is corrected to −4.

(3) In the case of the counting values 2 and 3 of the counter 4.

(3-1) When the output QD of the latch circuit 21 shows value "0".

As mentioned above, the output of the masking circuit 100 is equal to an output of the positive masking circuit 110 when the output QD of the latch circuit 21 shows value "0".

In this case, the output QA of the counter 4 shows value "0" or "1". The output QB of the counter 4 shows value "1" and the outputs QC and QD thereof show value "0". Accordingly, an output of the inverter 201 shows value "0" or "1". An output of the inverter 202 shows value "0" and outputs of the inverters 203 and 204 show value "1". Outputs of the NAND-functional circuits 211 and 212 show value "1" and an output of the inverter 213 shows value "0".

When the output QD of the latch circuit 21 shows value "0", an output of the NAND-functional circuit 205 shows value "1". Accordingly, outputs of the NAND circuits 221 and 222 show value "0" and an output of the NAND circuit 223 shows value "1".

Accordingly, outputs of the AND-functional circuits 112, 113 and 114 of the positive masking circuit 110 show value 0" at any time. Further, an output of the AND-functional circuit 111 shows value "1" if the output QA of the latch circuit 21 shows value "1". In contrast to this, the output of the AND-functional circuit 111 shows value "0" if the output QA of the latch circuit 21 shows value "0".

As a result, when binary numbers represented by the outputs QD to QA of the latch circuit 21 are "0000" and "0001", an output of the masking circuit 100 shows the same binary numbers "0000" and "0001". The counter 3 is reset when an output of the counter 3 shows the binary numbers "0000" and "0001". Accordingly, when the binary numbers represented by the outputs QD to QA of the latch circuit 21 show "0000" and "0001", a synchronous shift width at the changing point is corrected to zero. Namely, when the synchronous shift width in the positive shifting direction at the changing point is equal to or less than one, the synchronous shift width at the changing point is corrected to zero.

When the binary numbers represented by the outputs QD to QA of the latch circuit 21 show "0010" and "0011", an output of the masking circuit 100 shows "0000" and "0001". The counter 3 is reset when an output of the counter 3 shows "0000" and "0001". Accordingly, when the binary numbers represented by the outputs QD to QA of the latch circuit 21 show "0010" and "0011", a synchronous shift width at the changing point is corrected to +2. Namely, when the synchronous shift width in the positive shifting direction at the changing point is equal to 2 and 3, the synchronous shift width at the changing point is corrected to +2.

When the binary numbers represented by the outputs QD to QA of the latch circuit 21 show "0100" and "0101", an output of the masking circuit 100 shows "0000" and "0001". The counter 3 is reset when an output of the counter 3 shows "0000" and "0001". Accordingly, when the binary numbers represented by the outputs QD to QA of the latch circuit 21 show "0100" and "0101", a synchronous shift width at the changing point is corrected to +4. Namely, when the synchronous shift width in the positive shifting direction at the changing point is equal to 4 and 5, the synchronous shift width at the changing point is corrected to +4.

When the binary numbers represented by the outputs QD to QA of the latch circuit 21 show "0110" and "0111", an output of the masking circuit 100 shows "0000" and "0001". The counter 3 is reset when an output of the counter 3 shows "0000" and "0001". Accordingly, when the binary numbers represented by the outputs QD to QA of the latch circuit 21 show "0110" and "0111", a synchronous shift width at the changing point is corrected to +6. Namely, when the synchronous shift width in the positive shifting direction at the changing point is equal to 6 and 7, the synchronous shift width at the changing point is corrected to +6.

(3-2) When the output QD of the latch circuit 21 shows value "1".

As mentioned above, the output of the masking circuit 100 is equal to an output of the negative masking circuit 120 when the output QD of the latch circuit 21 shows value "1".

In this case, an output QA of the counter 4 shows value "0" or "1" and an output QB of the counter 4 shows value "1". Outputs QC and QD of the counter 4 show value "0". Accordingly, an output of the inverter 201 shows value "0" or "1" and an output of the inverter 202 shows value "0" and outputs of the inverters 203 and 204 show value "1". Accordingly, an output of the inverter 231 shows value "0" or "1" and an output of the inverter 232 shows value "1", and an output of the inverter 233 shows value "0". Further, outputs of the NOR circuits 241 and 242 show value "0" and an output of the inverter 243 shows value "1".

The output QD of the latch circuit 21 shows value "1" and the output QD of the counter 4 shows value "0" so that an output of the NAND-functional circuit 205 shows value "0". Accordingly, outputs of the NOR-functional circuits 251 and 252 show value "1" and an output of the NOR-functional circuit 253 shows value "0".

Accordingly, outputs of the OR circuits 122, 123 and 124 of the negative masking circuit 120 show value "1" at any time. Further, an output of the OR circuit 121 shows value "1" if the output QA of the latch circuit 21 shows value "1". In contrast to this, the output of the OR circuit 121 shows value "0" if the output QA of the latch circuit 21 shows value "0".

As a result, when binary numbers represented by the outputs QD to QA of the latch circuit 21 are "1111" and "1110", an output of the masking circuit 100 shows the same binary numbers "1111" and "1110". The counter 3 is reset when an output of the counter 3 shows the binary numbers "1111" and "1110". Accordingly, when the binary numbers represented by the outputs QD to QA of the latch circuit 21 show "1111" and "1110", a synchronous shift width at the changing point is corrected to zero. Namely, when the synchronous shift width in the negative shifting direction at the changing point is equal to or less than 2, the synchronous shift width at the changing point is corrected to zero.

When the binary numbers represented by the outputs QD to QA of the latch circuit 21 show "1101" and "1100", an output of the masking circuit 100 shows "1111" and "1110". The counter 3 is reset when an output of the counter 3 shows "1111" and "1110". Accordingly, when the binary numbers represented by the outputs QD to QA of the latch circuit 21 show "1101" and "1100", a synchronous shift width at the changing point is corrected −2. Namely, when the synchronous shift width in the negative shifting direction at the changing point is equal to 3 or 4, the synchronous shift width at the changing point is corrected to −2.

When the binary numbers represented by the outputs QD to QA of the latch circuit 21 show "1011" and "1010", an output of the masking circuit 100 shows "1111" and "1110". The counter 3 is reset when an output of the counter 3 shows "1111" and "1110". Accordingly, when the binary numbers represented by the outputs QD to QA of the latch circuit 21 show "1011" and "1010", a synchronous shift width at the changing point is corrected to −4. Namely, when the synchronous shift width in the negative shifting direction at the changing point is equal to 5 or 6, the synchronous shift width at the changing point is corrected to −4.

When the binary numbers represented by the outputs QD to QA of the latch circuit 21 show "1001"and "1000", an output of the masking circuit 100 shows "1111" and "1110". The counter 3 is reset when an output of the counter 3 shows "1111" and "1110". Accordingly, when the binary numbers represented by the outputs QD to QA of the latch circuit 21 show "1001" and "1000", a synchronous shift width at the changing point is corrected to −6. Namely, when the synchronous shift width in the negative shifting direction at the changing point is equal to 7 or 8, the synchronous shift width at the changing point is corrected to −6.

(4) In the case of the counting values 4 to 7 of the counter 4.

(4-1) When the output QD of the latch circuit 21 shows value "0".

As mentioned above, the output of the masking circuit 100 is equal to an output of the positive masking circuit 110 when the output QD of the latch circuit 21 shows value "0".

In this case, outputs QA and QB of the counter 4 show value "0" or "1". An output QC of the counter 4 shows value "1" and an output QD thereof shows value "0". Accordingly, outputs of the inverters 201 and 202 show value "0" or "1". An output of the inverter 203 shows value "0" and an output of the inverter 204 shows value "1". Outputs of the NAND-functional circuits 211, 212 and the inverter 213 show value "1".

When the output QD of the latch circuit 21 shows value "0", an output of the NAND-functional circuit 205 shows value "1". Accordingly, outputs of the NAND circuits 221, 222 and 223 show value "0".

Accordingly, outputs of the AND-functional circuits 112 to 115 of the positive masking circuit 110 show value 0" at any time.

As a result, when binary numbers represented by the outputs QD to QA of the latch circuit 21 are "0000" to "0111", an output of the masking circuit 100 shows binary number "0000". The counter 3 is reset when an output of the counter 3 shows the binary number "0000". Accordingly, when the binary numbers represented by the outputs QD to QA of the latch circuit 21 show "0000" to "0111, no synchronous shift width at the changing point is corrected. Namely, in the case of a synchronous shift in the positive shifting direction at the changing point, no synchronous shift width at the changing point is corrected.

(4-2) When the output QD of the latch circuit 21 shows value "1".

As mentioned above, the output of the masking circuit 100 is equal to an output of the negative masking circuit 120 when the output QD of the latch circuit 21 shows value "1".

In this case, outputs QA and QB of the counter 4 show value "0" or "1". An output QC of the counter 4 shows value "1" and an output QD thereof shows value "0". Accordingly, outputs of the inverters 201 and 202 show value "0" or "1". An output of the inverter 203 shows value "0" and an output of the inverter 204 shows value "1". Outputs of the inverters 231 and 232 show value "0" or "1". An output of the inverter 233 shows value "1". Further, outputs of the NOR circuits 241, 242, and the inverter 243 shows value "0".

The output QD of the latch circuit 21 shows value "1" and the output QD of the counter 4 shows value "0" so that an output of the NAND-functional circuit 205 shows value "0".

Accordingly, the outputs of the NOR-functional circuits 251 to 253 show value "1". Therefore, the outputs of the OR circuits 121 to 124 of the negative masking circuit show value "1" at any time.

As a result, when binary numbers represented by the outputs QD to QA of the latch circuit 21 are "1000" to "1111", an output of the masking circuit 100 shows binary number "1111". The counter 3 is reset when an output of the counter 3 shows the binary number "1111". Accordingly, when the binary numbers represented by the outputs QD to QA of the latch circuit 21 shows "1000" to "1111", a synchronous shift width at the changing point is corrected by one every shift. Namely, in the case of a synchronous shift in the negative shifting direction at the changing point, the synchronous shift width at the changing point is corrected by one every shift.

(5) In the case of the counting value of the counter 4 equal to or greater than 8.

(5-1) When the output QD of the latch circuit 21 shows value "0".

In this case, outputs QA, QB and QC of the counter 4 show value "0" or "1" and an output QD thereof shows value "1". An output of the AND-functional circuit 206 shows value "0". Accordingly, an operation of the digital data detecting circuit in this case is similar to that in the above-mentioned (4-1).

Accordingly, when binary numbers represented by the outputs QD to QA of the latch circuit 21 show "0000" to "0111", no synchronous shift width at the changing point is corrected. Namely, in the case of a synchronous shift in the positive shifting direction at the changing point, no synchronous shift width at the changing point is corrected.

(5-2) When the output QD of the latch circuit 21 shows value "1".

In this case, an output of the NAND-functional circuit 205 shows value "1" so that outputs of the NOR-functional circuits 251 to 253 show value "0" at any time. As a result, the output of the masking circuit 100 is equal to an output of the positive masking circuit 110.

Accordingly, when binary numbers represented by the outputs QD to QA of the latch circuit 21 show "1000" to "1111", no synchronous shift width at the changing point is corrected. Namely, in the case of a synchronous shift in the negative shifting direction at the changing point, no synchronous shift width at the changing point is corrected.

In accordance with this fourth embodiment of the present invention, it is possible to reduce the number of incorrect operations of the digital data detecting circuit caused by noises and make the operation of a synchronous circuit follow a change in data at the changing point. In the above step 1, the operation of the synchronous circuit follows an input signal in a range in which the shift width is ranged from $-4$ to $+3$. An error in shift width caused by noises is ranged from $-4$ to $+3$. In the above step 2, the operation of the synchronous circuit follows an input signal in a range in which the shift width is ranged from $-2$ to $+1$. An error in shift width caused by noises is ranged from $-2$ to $+1$. In the above step 3, the operation of the synchronous circuit follows an input signal in a range in which the shift width is ranged from $-1$ to 0. An error in shift width caused by noises is ranged from $-1$ to 0.

In the digital data detecting circuit in each of the above first to fourth embodiments of the present invention, the influence of a spike noise and a jitter is removed by controlling an operation of the reset control circuit for transmitting a reset signal of the synchronous signal generating counter so as to prevent an error in detected data from being caused.

In a fifth embodiment of the present invention, in the case of noises, the influence of a noise is removed by controlling the operation of a digital data detecting circuit such that no noise is detected as a data-changing point by a circuit for detecting a data-changing point.

The digital data detecting circuit in the fifth embodiment of the present invention will next be described in detail with reference to FIGS. 9 to 13.

Figure 9:
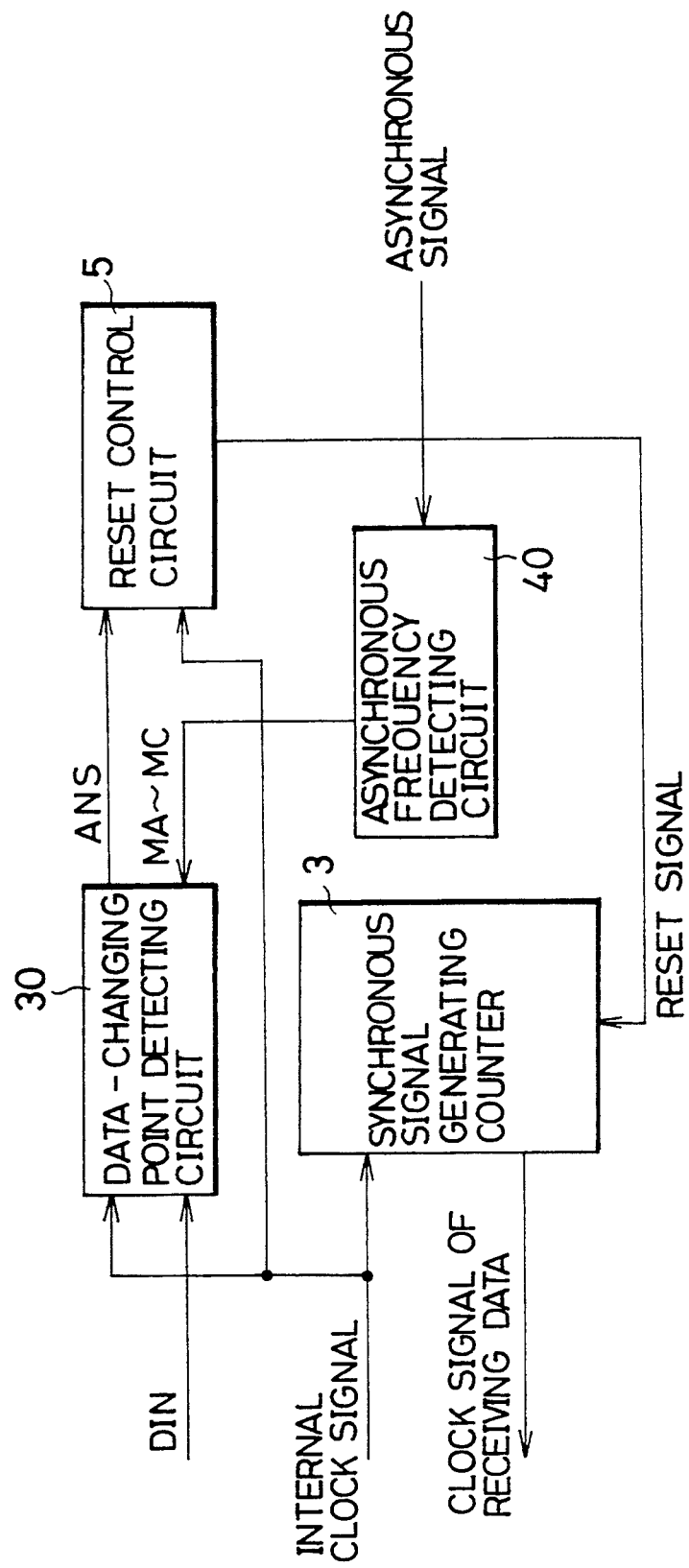
FIG. 9 is a block diagram showing the construction of a circuit for detecting digital data in accordance with a fifth embodiment of the present invention.
Figure 10:
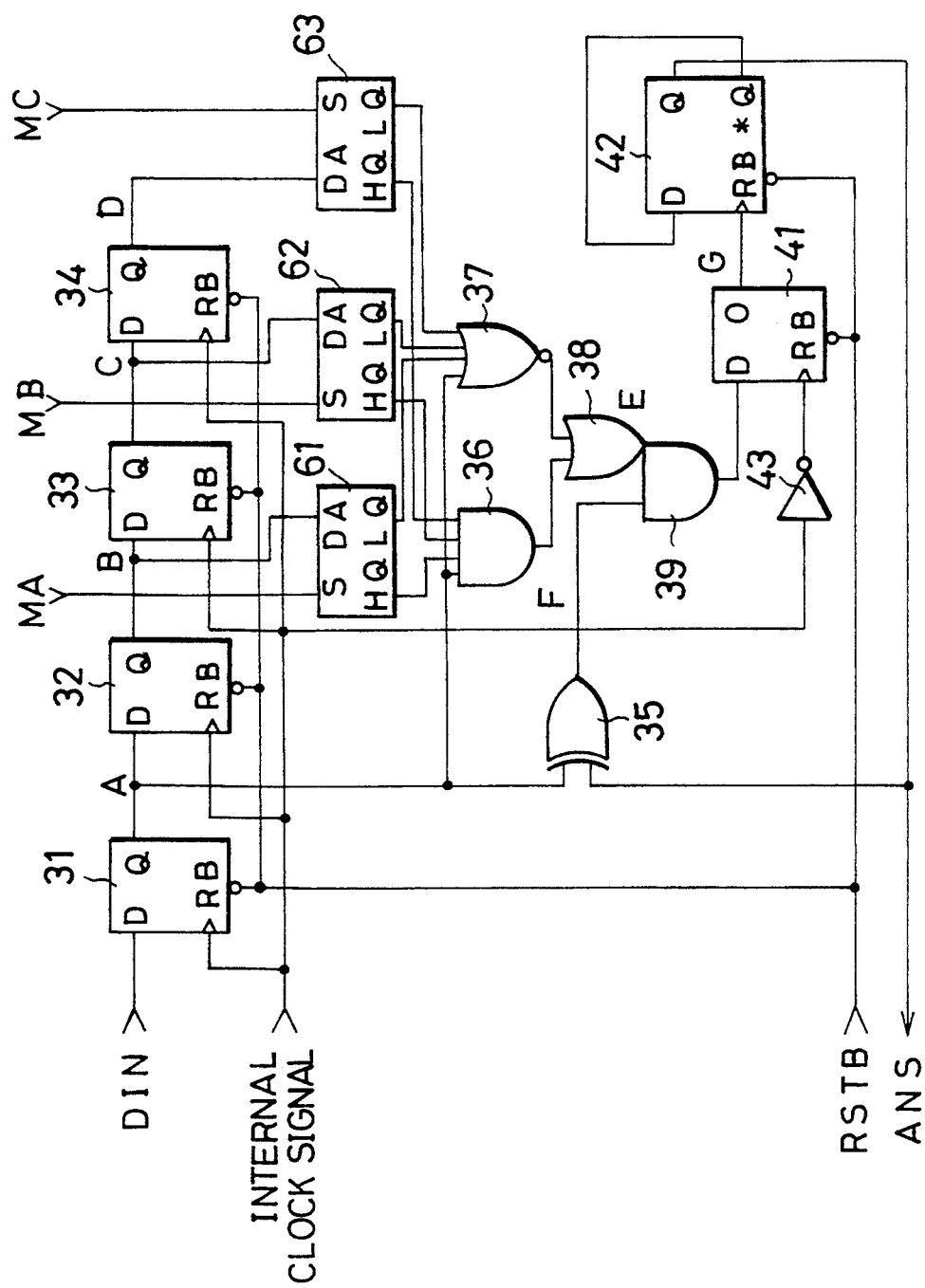
FIG. 10 is a circuit diagram showing a circuit for detecting a data-changing point and applied to the digital data detecting circuit in the fifth embodiment of the present invention.
Figure 11:
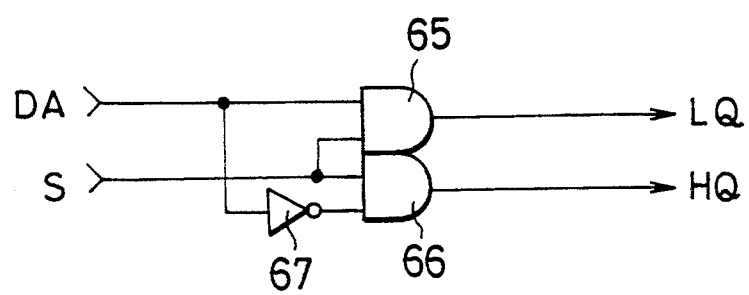
FIG. 11 is a circuit diagram of a module used in the changing point detecting circuit shown in FIG. 10.

FIG. 9 is a block diagram showing the construction of the digital data detecting circuit in accordance with the fifth embodiment of the present invention. FIG. 10 is a circuit diagram showing a circuit for detecting a data-changing point and applied to the digital data detecting circuit in the fifth embodiment of the present invention. FIG. 11 is a circuit diagram of a module used in the changing point detecting circuit shown in FIG. 10.

Figure 13:
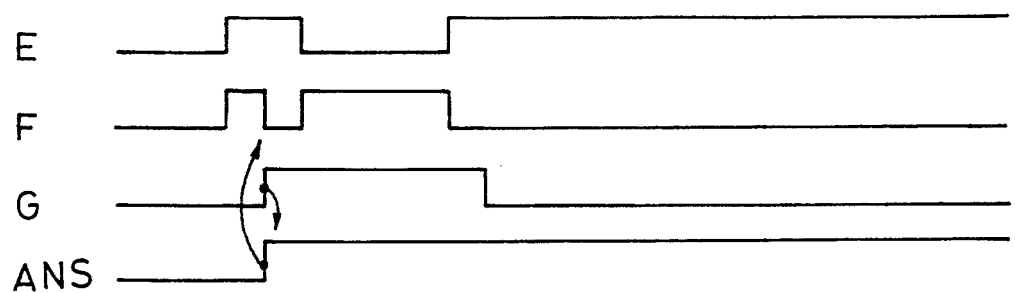
FIG. 13 is a timing chart showing signal states in which the frequency in asynchronization is minimized in the fifth embodiment of the present invention.
Figure 12:
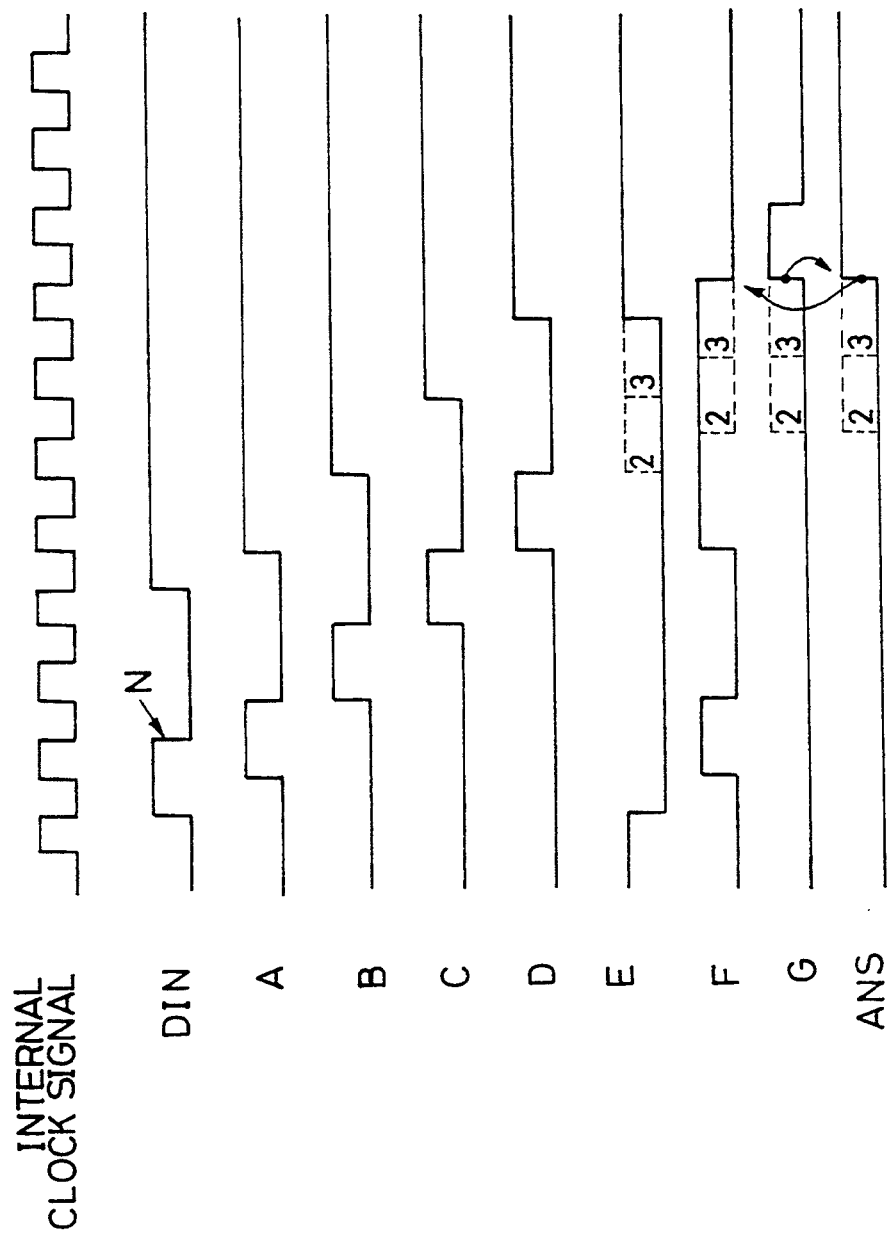
FIG. 12 is a timing chart showing signal states in which frequency in asynchronization is reduced from a maximum value thereof in the fifth embodiment of the present invention.

FIG. 12 is a timing chart of the digital data detecting circuit showing states in which a frequency in synchronization shift (or an asynchronous frequency) is reduced from a maximum value thereof in the fifth embodiment of the present invention. FIG. 13 is a timing chart of the digital data detecting circuit showing states in which the frequency in synchronization shift is minimized in the fifth embodiment of the present invention.

An entire construction of the digital data detecting circuit in the fifth embodiment of the present invention will next be described in detail with reference to FIG. 9.

In FIG. 9, a synchronous signal generating counter 3 is a counter having an original period equal to the period of an internal clock signal inputted to this counter. A receiving clock signal of data is formed by arbitrarily dividing this internal clock signal with respect to frequency. A clock signal of receiving data is reproduced by resetting this synchronous signal generating counter 3.

An asynchronous frequency detecting circuit 40 forms signals MA to MC showing a frequency in asynchronization based on an asynchronous signal detected by the asynchronous detecting circuit 2 shown in each of the above first to fourth embodiments. Otherwise, the asynchronous frequency detecting circuit 40 forms these signals MA to MC showing the frequency in asynchronization based on an asynchronous signal provided by a managing device composed of hardware or software of a link connection. The asynchronous frequency detecting circuit 40 transmits these signals MA to MC to a data-changing point detecting circuit 30 described later.

In this embodiment, the signals (MA, MB, MC) showing the asynchronous frequency are changed at four stages (H, H, H); (H, H, L); (H, L, L); and (L, L, L) in the order of a high asynchronous frequency. For example, with respect to the asynchronous frequency, it is possible to use a modified value of the counting value of a counter for counting the number of asynchronizations caused for a certain constant time.

The data-changing point detecting circuit 30 samples digital data (DIN) inputted thereto by the internal clock signal and changes a judging width of a noise in accordance with the output signals MA to MC from the asynchronous frequency detecting circuit 40. The data-changing point detecting circuit 30 judges whether the inputted data are a noise or receiving data. If the inputted data are receiving data, the data-changing point detecting circuit 30 changes an ANS signal from "L" to "H" in asynchronous frequency, or "H" to "L" in asynchronous frequency and transmits this changed ANS signal to a reset control circuit 5.

The internal clock signal and the ANS signal from the data-changing point detecting circuit 30 are inputted to the reset control circuit 5. The reset control circuit 5 forms a reset signal composed of a one-shot L-pulse from the ANS signal and transmits this reset signal to the synchronous signal generating counter 3. As mentioned above, the synchronous signal generating counter 3 reproduces and outputs a clock signal of receiving data synchronized with the internal clock signal when the synchronous signal generating counter 3 is reset by the above reset signal.

The features of the fifth embodiment of the present invention reside in the construction of the above data-changing point detecting circuit 30. An operation of the digital data detecting circuit including the data-changing point detecting circuit 30 in the fifth embodiment will next be described in detail with reference to FIGS. 10 to 13.

In FIG. 12, digital data DIN, an internal clock signal, an ANS signal, and node signals A to G respectively correspond to those shown in FIG. 10.

An internal clock signal and digital data (DIN) shown in FIG. ].2 are inputted to the data-changing point detecting circuit 30. Namely, this internal clock signal and these digital data (DIN) are inputted to a first D-type flip-flop circuit 31 of the data-changing point detecting circuit 30 (see FIG. 10). Concretely, the digital data (DIN) are inputted to a D-terminal of the first D-type flip-flop circuit 31 and the internal clock signal is inputted to a trigger terminal of the first D-type flip-flop circuit 31. This first D-type flip-flop circuit 31 outputs a data signal A shown in FIG. 12 from a Q-terminal thereof to a D-terminal of a second D-type flip-flop circuit 32. Further, the internal clock signal is inputted to a trigger terminal of the second D-type flip-flop circuit 32.

A data signal B shown in FIG. 12 is outputted from a Q-terminal of this second D-type flip-flop circuit 32 to a D-terminal of a third D-type flip-flop circuit 33. Further, the internal clock signal is inputted to a trigger terminal of the third D-type flip-flop circuit 33.

A data signal C shown in FIG. 12 is outputted from a Q-terminal of this third D-type flip-flop circuit 33. An output of the third D-type flip-flop circuit 33 at the Q-terminal thereof is transmitted to a D-terminal of a fourth D-type flip-flop circuit 34. The internal clock signal is inputted to a trigger terminal of the fourth D-type flip-flop circuit 34. A data signal D shown in FIG. 12 is outputted from a Q-terminal of the fourth D-type flip-flop circuit 34.

As shown by digital data (DIN) in FIG. 12, the digital data (DIN) include a glitch noise (N) synchronized with the clock signal. This noise (N) is also transmitted through each of the flip-flop circuits 31 to 34.

The output of the first flip-flop circuit 31 from the Q-terminal thereof is transmitted to one input terminals of an exclusive OR circuit 35, an AND circuit 36 and a NOR circuit 37.

A detecting signal ANS at a changing point is transmitted to the other input terminal of the exclusive OR circuit 35. This exclusive OR circuit 35 outputs a signal F shown in FIG. 12.

The output signals MA to MC from the asynchronous frequency detecting circuit 40 are respectively transmitted to S-terminals of module circuits 61 to 63. The outputs of the second, third and fourth flip-flop circuits 32, 33, 34 from the Q-terminals thereof are respectively inputted to DA-terminals of the module circuits 61 to 63. Namely, the output of the second flip-flop circuit 32 from the Q-terminal thereof is inputted to the DA-terminal of the module circuit 61. The output of the third flip-flop circuit 33 from the Q-terminal thereof is inputted to the DA-terminal of the module circuit 62. The output of the fourth flip-flop circuit 34 from the Q-terminal thereof is inputted to the DA-terminal of the module circuit 63. The module circuits 61 to 63 output respective signals from HQ-terminals and LQ-terminals thereof. The output signals of the module circuits 61 to 63 from the HQ-terminals thereof are respectively inputted to an AND circuit 36. The output signals of the module circuits 61 to 63 from the LQ-terminals thereof are respectively inputted to a NOR circuit 37.

As shown in FIG. 11, each of the module circuits 61 to 63 is constructed by two AND circuits 65, 66 and an inverter 67. An input signal inputted to the DA-terminal of each of the module circuits is inputted to an AND circuit 65 and an inverted signal of the input signal at this DA-terminal is inputted to an AND circuit 66 through an inverter 67. An input signal inputted to the S-terminal of each of the module circuits is inputted to the AND circuits 65 and 66. The AND circuit 65 outputs a signal from the LQ-terminal of each of the module circuits. Further, the AND circuit outputs a signal from the HQ-terminal of each of the module circuits.

The output of each of the module circuits 61 to 63 at the HQ-terminal thereof shows "H" in asynchronous frequency when the output of each of the flip-flop circuits shows "L" in asynchronous frequency and the output signal MB or MC from the asynchronous frequency detecting circuit 40 shows "H" in asynchronous frequency. The output of each of the module circuits 61 to 63 at the HQ-terminal thereof shows "L" i n asynchronous frequency in the other cases. The output of each of the module circuits 61 to 63 at the LQ-terminal thereof shows "H" in asynchronous frequency when the output of each of the flip-flop circuits shows "H" in asynchronous frequency and the output signal MA, MB or MC from the asynchronous frequency detecting circuit 40 shows "H" in asynchronous frequency. The output of each of the module circuits 61 to 63 at the LQ-terminal thereof shows "L" in asynchronous frequency in the other cases.

Outputs of the AND circuit 36 and the NOR circuit 37 are inputted to an OR circuit 38. The OR circuit 38 outputs a signal E shown in FIG. 12 and having a pulse width in accordance with the output signal of the asynchronous frequency detecting circuit 40.

This output signal E of the OR circuit 38 is inputted to an AND circuit 39. An output of the exclusive OR circuit 35 is also inputted to this AND circuit 39. An output of the AND circuit 39 is inputted to a D-terminal of a flip-flop circuit 41. The internal clock signal is inputted to a trigger terminal of this flip-flop circuit 41 through an inverter 43. The flip-flop circuit 41 outputs a signal G shown in FIG. 12 from a Q-terminal thereof. This signal G has a pulse width in accordance with the output signal of the asynchronous frequency detecting circuit .40. This signal G is transmitted from the flip-flop circuit 41 to a trigger terminal of a flip-flop circuit 42. An output of the flip-flop circuit 42 at a *Q-terminal thereof is feedbaek-inputted to a D-terminal of this flip-flop circuit 42. The flip-flop circuit 42 outputs a detecting output signal ANS at the changing point shown in FIG. 12 from a Q-terminal thereof.

A reset signal RSTB is inputted to a reset terminal RB of each of the above-mentioned flip-flop circuits.

Signal waveforms shown by solid line in FIG. 12 are provided when (MA, MB, MC) =(H, H, H) at the maximum of asynchronous frequency. Signal waveforms shown by broken line 2 in FIG. 12 are provided when (MA, MB, MC) =(H, L, L). Signal waveforms shown by broken line 3 in FIG. 12 are provided when (MA, MB, MC) =(H, H, L).

Further, signal waveforms shown in FIG. 13 are provided when (MA, MB, MC) =(L, L, L) at the minimum of asynchronous frequency.

From FIG. 12, it should be understood that the signal waveforms are changed from signal waveforms shown by solid line to signal waveforms shown by broken line 2 through signal waveforms shown by broken line 3 when the asynchronous frequency is reduced, thereby improving frequency follow-up characteristics.

The ANS signal is changed when the glitch noise (N) is inputted as shown in FIG. 12 at the minimum time of the asynchronous frequency as shown in FIG. 13. Therefore, in this embodiment, (MA, MB, MC) is automatically set to be selectively equal to (H, L, L), (H, H, L), or (H, H, H) in accordance with the asynchronous frequency on a line on which the digital data (DIN) include many glitch noises having a pulse width as shown in FIG. 12. Thus, the operation of the digital data detecting circuit is stabilized since the influences of the glitch noises are removed.

In the above fifth embodiment of the present invention, an output of the asynchronous frequency detecting circuit 40 is constructed by three bits, and the asynchronous frequency detecting circuit 40 provides four kinds of frequency states. However, when the number of frequency states is further increased, it is sufficient to increase the number of output bits of the asynchronous frequency detecting circuit 40. In this case, it is possible to easily cope with the increase in output bit by correspondingly increasing the number of flip-flop circuits and the number of module circuits in the data-changing point detecting circuit 30.

As mentioned above, in accordance with first circuit and method for detecting digital data in the present invention, the number of jitters and the number of spike noises are reduced by controlling the timing of a reset operation of a synchronous signal generating counter based on the output of a counter for counting the number of asynchronizations and the output of a data-changing point detecting circuit. Thus, it is possible to provide a stable signal of a phase control loop.

Further, the number of jitters and the number of spike noises are reduced by correcting a nonzero timing of the changing point by a masking circuit in the case of a continuous synchronization.

In accordance with a second digital data detecting circuit in the present invention, it is possible to reduce the number of incorrect operations of the digital data detecting circuit caused by noises and make the operation of a synchronous circuit follow a change in data at a changing point.

In accordance with a third digital data detecting circuit in the present invention, a pulse width for noise judgment is selected in accordance with asynchronous frequency so that the number of samplings of digital data is adjusted in accordance with the amount of a noise. Accordingly, the trade-off of frequency follow-up characteristics and noise-proof characteristics is solved and the digital data detecting circuit can be used in any line circumstances.

Many widely different embodiments of the present invention may be constructed without departing from the spirit and scope of the present invention. It should be understood that the present invention is not limited to the specific embodiments described in the specification, except as defined in the appended claims.

What is claimed is:

1. A digital data detecting circuit for forming a receiving clock signal synchronized with every bit of digital data and detecting contents of the digital data, said digital data detecting circuit comprising:

a synchronous signal generating counter, responsive to a reference clock signal, for generating the receiving clock signal sychronized with every bit of digital data;

a data-changing point detecting circuit for detecting a changing point of the digital data at which a value indicative of the digital data is changed from value 1 to value 0, or value 0 to value 1;

an asynchronous detecting circuit, responsive to the data-changing point detecting circuit and the synchronous signal generating counter, for detecting asyncroizations by judging whether or not said changing point occurs at the timing of the reference clock signal;

an asynchronous counter for counting the number of detected asynchronizations; and a reset control circuit for controlling the timing of a reset operation of said synchronous signal generating counter in accordance with outputs of said data-changing point detecting circuit and said asynchronous counter.

2. A digital data detecting circuit as claimed in claim 1, which further comprises a masking circuit and wherein said reset control circuit controls said masking circuit to correct a nonzero timing of said changing point to a zero timing in accordance with the output of said asynchronous counter.

3. A digital data detecting circuit as claimed in claim 2, wherein said masking circuit comprises a positive masking circuit for correcting the timing of the changing point shifted in a positive shifting direction and a negative masking circuit for correcting the timing of the changing point shifted in a negative shifting direction.

4. A digital data detecting circuit for forming a receiving clock signal synchronized with every bit of digital data and detecting contents of the digital data, said digital data detecting circuit comprising:

a synchronuous signal generating counter, responsive to a reference clock signal, for generating the receiving clock signal sychronized with every bit of digital data;

a data-changing point detecting circuit for detecting a changing point of the digital data at which a value indicative of the digital data is changed from value 1 to value 0, or value 0 to value 1;

a masking pattern control circuit, responsive to a signal from the synchronous signal generating counter, for determining a masking bit to be masked in accordance with a shift amount of the timing of the changing point; and a masking circuit, responsive to the masking pattern control circuit, for masking a bit of an output of the synchronous signal generating counter when the changing point is detected by the data-changing point detecting circuit; and a reset control circuit for controlling the timing of a reset operation of said synchronous signal generating counter based on an output of the masking circuit.

5. A digital data detecting circuit as claimed in claim 4, wherein the masking pattern control circuit generates one of a plurality of masking patterns for determining the masking bit in accordance with the shift amount of the timing of the changing point, and the operation of the masking circuit is controlled on the basis of the generated masking pattern.

6. A digital data detecting circuit for forming a receiving clock signal synchronized with every bit of digital data and detecting contents of the digital data, said digital data detecting circuit comprising:

a synchronous signal generating counter, responsive to a reference clock signal, for generating a synchronous signal;

a changing point detecting circuit for detecting a changing point of the digital data at which a value indicative of the digital data is changed from value 1 to value 0, or value 0 to value 1, said changing point detecting circuit using a selectable pulse width for noise judgment and neglecting a noise having a pulse width equal to or less than said pulse width for noise judgment;

an synchronous frequency detecting circuit, responsive to an output of the changing point detecting circuit, for detecting asynchronizations occurring in a constant period and outputting a signal in accordance with the frequency of asynchronizations; and a reset control circuit for controlling the timing of a reset operation of said synchronous signal generating counter in accordance with said output of the changing point detecting circuit and the signal output from said asynchronous frequency detecting circuit.

7. A digital data detecting circuit as claimed in claim 6, wherein the pulse width for noise judgment is selected in accordance with the frequency of asynchronization.

8. A method for forming a receiving clock signal synchronized with every bit of digital data and detecting contents of the digital data, said method comprising the steps of:

detecting a changing point of the digital data at which a value indicative of the digital data is changed from value 1 to value 0, or value 0 to value 1;

detecting asychronizations in response to the detected changing point by judging whether or not said changing point occurs at the timing of a reference clock signal;

counting the number of detected asynchronizations; and controlling the timing of a reset operation of a synchronous signal generating counter generating the receiving clock signal sychronized with every bit of digital data in accordance with the detected changing point and the detected number of asynchronizations.

* * * * *